April 25, 1933.    A. H. RINEY    1,906,182
PROTECTOR FOR THREADED PIPE ENDS
Filed May 2, 1930    2 Sheets-Sheet 1

Inventor
Arthur H. Riney
By Robt. E. Barry
Attorney

April 25, 1933.  A. H. RINEY  1,906,182
PROTECTOR FOR THREADED PIPE ENDS
Filed May 2, 1930    2 Sheets-Sheet 2

Inventor
Arthur H. Riney
By Robt. E. Barry
Attorney

UNITED STATES PATENT OFFICE

ARTHUR H. RINEY, OF BARTLESVILLE, OKLAHOMA, ASSIGNOR TO PHILLIPS PETROLEUM COMPANY, OF BARTLESVILLE, OKLAHOMA, A CORPORATION OF DELAWARE

PROTECTOR FOR THREADED PIPE ENDS

Application filed May 2, 1930. Serial No. 449,197.

This invention pertains to means for sealing and protecting pipe or tube ends having threads or threaded couplings thereon.

In the manufacture, shipping, handling, laying, and use of screw jointed pipe, and all tubular products having screw joints for and by the various industries for handling liquids or gases, the threaded pipe end or its threaded coupling is liable to injury through deformation by weights or physical impact, where the joint must be made by joining the screwed ends together with suitable couplings. This necessitates the repairing of pipe or the couplings, so that the joints may be made satisfactorily, by either making the ends of the pipe perfectly round, or cutting off a length of the pipe and re-threading, or making the couplings perfectly round and re-threading the same. Also, the open ends of the pipe allow the accumulation of foreign matter, dirt, sand, mud, etc., within the pipe, during shipping, handling or laying; especially during the latter operation, when the pipe is allowed to lay for some time on the ground or in a ditch, exposed to the elements, and surface water drainage. Pipe is usually cleaned at the mill, and it is necessary that the pipe is kept clean until ready for its contents, especially in the event of its use for transporting petroleum refined products, such as gasoline, when contaminating matter must be eliminated. Furthermore, the accumulation of moisture inside the pipe stimulates the progress of corrosion and rust formation, with the result of further fouling of the inside surface of the pipe.

In order to overcome these disadvantages, and for other purposes which will become apparent as the invention is disclosed, I have invented a pipe protector and sealer for use with pipes of the class mentioned. The protector and sealer is inserted at the factory or mill, as soon as the pipe is manufactured, and will prevent the deformation of the pipe end or its coupling, as well as the threads of the same, and will keep out contaminating or foreign matter by sealing the ends of the pipe or tube.

There are other features of the invention, as will more fully appear from the detail description of the embodiments which have been chosen for the purpose of illustrating the invention, when taken in connection with the accompanying drawings, in which, Fig. 1 is a longitudinal sectional view of a threaded ended pipe provided with a pair of my protectors.

Figure 1:
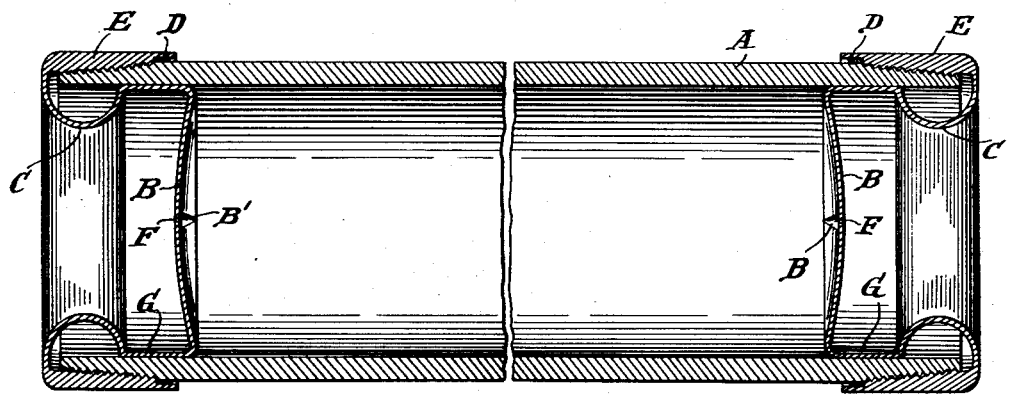
Figure 2:
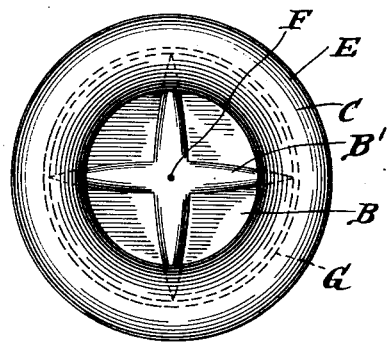
Fig. 2 is an elevation of one of the protectors.

In the embodiment of the invention illustrated in Figs. 1 and 2, A designates a pipe or tube having external threads A' at its ends which are sealed by means of my improved protectors. Each protector and sealer consists of a back B which is deformed as shown at B' for maximum strength; a neck or collar G, long enough to allow the handling of the pipe with hooks placed in its ends; and a flange C which prevents the protector and sealer from being inserted in the pipe too far, and protects the ends of the pipe from injury from physical impact. The flange C is in the shape of a ring that is channel-shaped in cross section, and one end of the flange is extended to provide a collar E which surrounds the pipe end and has a threaded inner surface which snugly engages the threads A'. The channel-shaped portion of the flange provides sufficient resiliency to cause the collar E to clamp itself on the threads A' when the back B is inserted into the pipe end, at which time the neck G snugly engages the inner surface of the pipe.

The protectors or sealers are shown attached to the pipe ends, in the manner in which they are applied at the pipe factory, and each protector will be held on the pipe by the threads A'.

A small aperture or pin hole F allows the escape of air from within the pipe when the pressure of such air is built up through a large increase in the temperature, over the temperature at which the protector and sealer was inserted. This hole F also allows the admission of air in the event of a drop in the temperature, and the causing of a partial vacuum within the pipe or tube. The hole is made too small to allow free flow of water when one end is submerged, and the other end is in the air, and any objectionable sediment would be caught therein, stopping up the hole against the intrusion of muddy water. The hole in one protector, will allow the escape and admission of air in the event that the hole in the other protector is stopped up. If both holes are under water, little water can be admitted because there is no provision for the escape of air in that case.

A rubber gasket D is inserted under the threaded collar E, when absolute water-proof protection is necessary.

Figure 3:
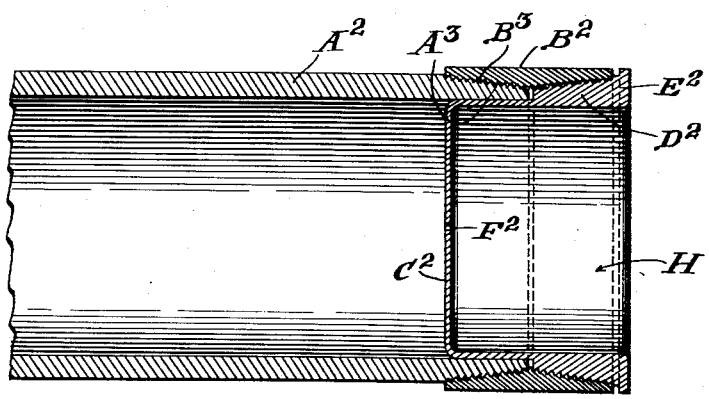
Fig. 3 is a view similar to Fig. 1, of a pipe having a screw threaded coupling, with a modification of my protector attached thereto.
Figure 4:
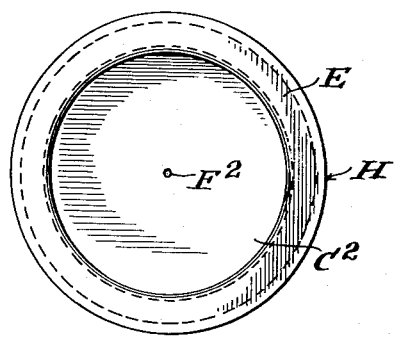
Fig. 4 is an elevation of the modified protector.

The embodiment of the invention illustrated in Figs. 1 and 2 has been specifically designed for use with pipe ends having external threads, but the principal features of the invention may also be employed with pipe ends having internal threads, either directly on the pipe or on a coupling sleeve attached to the pipe. For example, in the modification shown in Figs. 3 and 4, the protector H has external threads to accommodate internal threads in a coupling B2. In this form of the invention, the pipe A2 has external threads A3 at its end to engage internal threads B3 of the coupling sleeve B2. The coupling B2 is put on the pipe at the mill or factory, and the protector and sealer consists of a back C2, a neck D2, which is threaded for screwing into the coupling, and a flange E2 which is used for withdrawing the protector and sealer, and which protects the end of the coupling from deformation. All portions of the protector are integrally united.

A small aperture or pin hole F2 functions in the same manner as the hole F in Figs. 1 and 2.

Among the advantages to be gained through the use of such a device are:

1. Protection against bending the end of the pipe or coupling out of round by heavy loading or physical impact, which results in:

(a) Better and more efficient screwed joints.

(b) Saving of labor formerly required to true up pipe or coupling, making end round, or re-threading the pipe end or coupling.

2. Protection against accumulation of contaminating or foreign matter such as dirt, sand, etc., during shipment, handling, or using, resulting in:

(a) Clean lines for transporting liquids or gases, especially petroleum products such as gasoline, which requires that the pipe be entirely free of contaminating matter to avoid the wasting of much of the product.

(b) Protection against corrosion and the rapid formation of rust scale, which would foul the inside surface of the pipe before use.

(c) Protection against accumulation of mud and water which has frequently happened in the past, due to the pulling of the pipe along the ground into place for joining it to the line.

The pipe protector and sealer is made of suitable materials of which pressed steel may be one, and is pressed into or screwed on to the pipe or coupling in such a fashion as to give the protection mentioned.

The designs of the two embodiments of this invention is disclosed herein, and while I have conceived other embodiments which might be used, I have found these to be the most practical, and have included them to illustrate the principle.

It will be observed that in each instance, the protector comprises a cup-shaped part, the bottom of which is arranged within the pipe, so that handling hooks may be inserted into the end of the pipe without interference by the protector. It will also be noted that the protector has sufficient rigidity to withstand relatively heavy weights or blows, so as to prevent distortion of the pipe end or coupling.

While I have disclosed what I now consider to be preferred embodiments of the invention in such manner that the same may be readily understood by those skilled in the art, it is manifest that changes may be made in the details disclosed, without departing from the spirit of the invention, as expressed in the claims.

What I claim and desire to secure by Letters Patent is:

1. The combination with a pipe having external threads, of a protector cap sealing one of the pipe ends against the entrance of water and having a threaded collar engaging the pipe threads, said cap including a cup-shaped handling hook receiving part extending into the pipe end and having a reinforced rigid back.

2. The combination with a pipe having external threads, of a rigid protector cap having a threaded collar engaging the pipe threads, said cap including a cup-shaped part extending into the pipe end a distance substantially greater than the length of the threaded portion of the pipe and having a rigid back provided with a pin hole.

3. A protector for the threaded end of a pipe, comprising a rigid back provided with a pin hole for the passage of air, but too small for the passage of water, the back being imperforate with the exception of the pin hole, a cylindrical wall integral with and projecting from the back, an annular channel-shaped flange integral with the outer portion of the wall, and a collar integral with the outer portion of the flange and surrounding the wall and flange, said collar having internal screw threads.

4. The combination with a pipe having threads at its ends, of rigid metallic protecting caps having threads engaging the threads of the pipe and sealing the ends of the pipe against the entrance of water, each cap having a substantially cup-shaped portion projecting into the pipe for a sufficient distance to form a hook receiving cavity, the cup shaped portion of each cap including an indeformable reinforced disk from which projects a cylindrical wall having its outer surface snugly engaging the inner surface of the pipe.

In testimony whereof, I hereto affix my signature.

ARTHUR H. RINEY.